Aug. 23, 1960 J. STRANGE 2,950,134
FASTENING ASSEMBLY AND CLIP
Filed Feb. 13, 1957

INVENTOR.
JOHN STRANGE
BY
Bates, Teare & McBean
ATTORNEYS

United States Patent Office 2,950,134
Patented Aug. 23, 1960

2,950,134

FASTENING ASSEMBLY AND CLIP

John Strange, Llanishen, Cardiff, Wales, assignor to Tinnerman Products Inc., Cleveland, Ohio, a corporation of Ohio Filed Feb. 13, 1957, Ser. No. 640,003

4 Claims. (Cl. 287—53)

This invention relates to fastening assemblies and also to a clip for detachably securing a male and a female member together in interlocking engagement.

Various types of apparatus utilize fastening assemblies embodying a male and a female member detachably secured together so that they may be readily assembled or disassembled at will. For example, instruments which can be controlled by an operator utilize control knobs having sockets which are detachably secured on a plug such as a control shaft. In such equipment it is desirable that the control knobs be firmly positioned on the shaft during ordinary usage, while at the same time permitting separation for purposes of maintenance and adjustment. The use of set screws and other frictional type devices have not been entirely satisfactory and this invention is directed to improvements in such fastening devices which will readily permit interlocking assembly without the use of external tools while requiring the application of an external tool to release the interlock for disassembly.

Accordingly, it is an object of this invention to provide a fastening assembly wherein a plug and socket may be secured in interlocking engagement through the medium of a releasable key.

A further object of this invention relates to the provision of an improved knob and shaft assembly having a self-retaining one-piece sheet metal clip adapted to releasably coact therebetween as a key to detachably secure them together with a minimum number of parts.

Briefly, in accordance with this invention, the improved knob and shaft assembly utilizes a shaft whose end portion is provided with an intermediately disposed, axially extending recess which houses a self-retaining one-piece sheet metal clip having a resilient detent adapted to engage a transverse aperture communicating with the socket in the knob when the shaft and the clip are inserted in the socket to secure the shaft to the knob against unintentional withdrawal therefrom. The clip coacts between the shaft and socket as a releasable key and has a formation that will yield readily to admit the shaft and clip into the socket and thereafter resist removal of the shaft from the socket until the detent is depressed through the transverse aperture in the knob by some external means.

Figure 1:
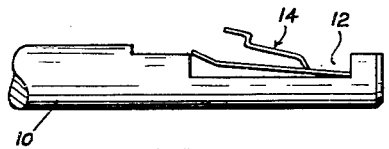
Fig. 1 is a view of a portion of the control shaft illustrating the location of the clip member therein.
Figure 2:
Fig. 2 is an end view of the shaft of Fig. 1.

Referring now more particularly to Figs. 1 and 2 of the drawings, the shaft 10 is shown as being of D-shaped cross section and as having an intermediately disposed, axially extending recess 12 forming a cavity for receiving a one-piece, semi-rigid clip member 14 which coacts therewith during assembly as a releasable key to secure the shaft in the socket aperture of a knob or handle 15 in a manner to be hereinafter more fully described.

Figure 3:
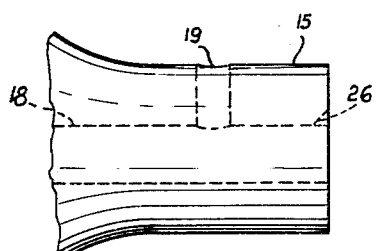
Fig. 3 is a view of the socket portion of a control knob.
Figure 4:
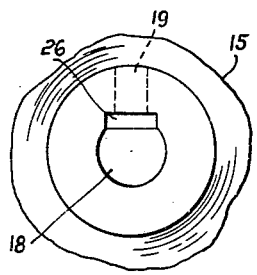
Fig. 4 is an end view of the socket portion of the knob.

As best shown in Figs. 3 and 4, the control knob 15 has a socket in the form of an axially extending recess 18 of D-shaped cross section adapted to receive the complementary end portion of the shaft 10 therein. When assembled, the bottom wall of the recess 12 and the flat face of the D-shaped socket are parallel to each other and coact with the recess end walls to form an enclosure for the clip member 14. The knob also has a transverse aperture 19 extending from its periphery into communication with the axial socket recess 18 for interlocking coaction with a portion of the clip 14 in the manner to be hereinafter more fully described.

Figure 5:
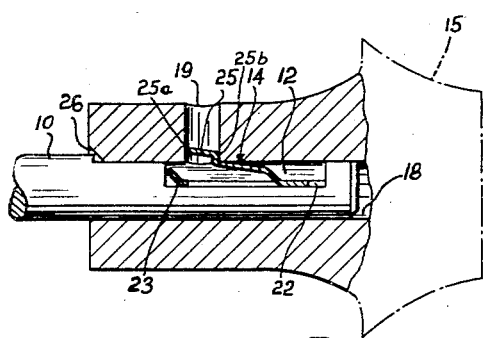
Fig. 5 is a sectional view through the knob socket illustrating the interlocked position of the control shaft and clip member therein.
Figure 6:
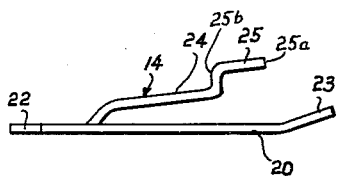
Fig. 6 is an edge view of the clip member.
Figure 7:
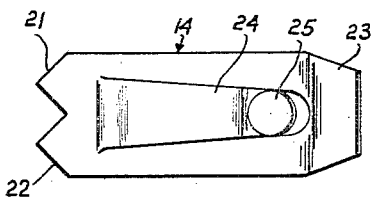
Fig. 7 is a plan view of the clip member.

As best shown in Figs. 6 and 7, the clip member 14 is formed from a single piece of spring steel or other resilient metal to provide a base portion 20 having one or more co-planer prongs 21 and 22 at one end; the other end portion 23 of the base being upwardly bent. The length of the base portion 20 is slightly greater than the length of the shaft recess 12 so that when the clip member is partly housed in the shaft recess with the prongs 21 and 22 engaging one end wall of the recess, the clip member may be fully housed in the recess by applying pressure to the base, whereby the upwardly bent generally resilient lip or end portion 23 of the base is bent further away from the base. In moving the clip member to its fully applied position, the base is tensioned and the prongs and the upwardly bent portion of the base are caused to dig into the end walls of the shaft recess, whereby the clip member holds itself in self-retaining position in such recess Fig. 5. Struck from the base 20 to extend upwardly therefrom intermediate the ends is a tongue portion 24 which tapers somewhat towards its free extremity and which has a circular, upwardly offset free end forming a detent 25. It will be seen that detent 25 provides lengthwise spaced abutments 25a and 25b, such abutments being disposed in planes extending generally perpendicular to the plane of base 20 of the clip.

With the clip member 14 positioned in its self-sustaining position in the shaft recess 12 and the detent 25 projecting beyond the flat top face of the shaft 10, the shaft may be inserted into the knob recess 18 until the detent engages the wall of the knob surrounding the recess. Further inward movement of the shaft 10 causes the free end of the tongue 24 to move inwardly to allow the detent 25 to slide against the flat wall of the knob recess 18, the end 26 of such wall being beveled to promote the camming action thereof. The inward movement of the shaft 10 is continued until the detent 25 registers with the transverse aperture 19 in the knob, when the detent snaps into such aperture to secure the knob to the shaft as best shown in Fig. 5. As can be seen from Fig. 5, when detent 25 is received in the complementary aperture 19 in knob 15, the abutting engagement between lengthwise spaced and generally vertical abutments 25a and 25b on the detent and the opposing defining surface portions of the aperture 19, effectively locates the knob 15 on shaft 10 and positively prevents relative axial movement in either direction between the knob and the shaft. The knob 15 may however be released when desired by inserting a suitable tool or other means into the transverse aperture 19 and pressing the detent 25 downwardly to such an extent that the shaft 10 may be withdrawn from the knob socket.

Thus, there has been provided an improved fastening assembly having a minimum number of parts for detachably securing a male and a female member together against unintentional withdrawal. The assembly includes a resilient clip member which coacts in self-retaining relation on the male member for insertion into a socket in the female member and which is adapted to releasably engage an aperture in the female member to provide an interlock during ordinary usage.

While I have shown and described what I consider to be a preferred form of my invention, it will be obvious to those skilled in the art that other changes and modifications may be made in the fastening assembly and clip without departing from the scope of my invention as defined by the appended claims.

I claim:

1. A one piece fastening clip for detachably securing a male shaft-like member within a female knob-like member, comprising a flat strip of sheet metal forming a base, a resilient tongue struck from a partially severed portion of said base intermediate the ends of and inwardly of all edges of said base, said tongue extending upwardly from its juncture with said base lengthwise of said base and terminating short of the respective end of said base, detent means formed from the free end of said tongue and extending upwardly with respect to the tongue, said detent means being adapted for releasable holding engagement with a cooperating portion of the female member, said detent means comprising lengthwise spaced abutments facing in opposite directions, each of said abutments facing toward a transverse plane passing through a respective end of said base, said abutments being disposed in planes slightly inclined to the plane of said base, and means formed from said base on the opposite ends thereof adapted for self-retaining engagement with a cooperating portion of the male member, said last mentioned means comprising a diagonally upwardly bent generally resilient lip portion on one end of said base and prong means on the other end of said base, the free end of said lip portion being disposed below the elevation of said detent means above said base.

2. In a fastening assembly comprising a female member and a male member adapted for relative axial movement, said female member having an axial recess therein and having a transverse aperture extending from the exterior of said female member into communication with said recess, said male member extending into said recess in said female member and having an axially extending exterior depression including spaced defining end surfaces, and a one piece fastening clip seated in said depression in self-retaining non-moving condition relative to said male member for detachably securing said male member in predetermined position within said female member, said clip comprising a flat strip of sheet metal forming a base, a resilient tongue struck from a partially severed portion of said base intermediate the ends of and inwardly of all edges of said base, said tongue extending outwardly from its juncture with said base lengthwise of the base and in a direction opposite to that in which said male member is inserted into the female member, said tongue terminating short of the respective end of said base, detent means formed from the free end of said tongue and extending outwardly with respect to said tongue, said detent means comprising lengthwise spaced abutments facing in opposite directions, each of said abutments facing toward a transverse plane passing through a respective end of said base, said abutments being disposed in planes slightly inclined to the plane of said base, said abutments being releasably received in said aperture in snug relation to defining surface portions of said aperture to secure said female member in fixed position on said male member and against relative axial movement of said members in either direction, said aperture providing external access to permit depression of said tongue and thus movement of said abutments out of said aperture to thus permit relative axial movement between said male and female members, and means formed from said base on the opposite ends thereof engaging in holding relation the respective of said defining end surfaces of said depression, said last mentioned means comprising a generally resilient lip portion on said one end of said base extending outwardly from said base in the same general direction as said tongue, and prong means extending from the other end of said base, the free end of said lip portion being disposed closer to the plane of said base than is said detent means.

3. In a fastening assembly in accordance with claim 2 wherein said prong means comprises a plurality of transversely spaced prongs disposed in the plane of said base.

4. In a fastening assembly in accordance with claim 2 wherein said aperture is of round configuration and said detent means comprises a substantially circular outwardly offset portion formed from the free end of said tongue.

References Cited in the file of this patent

UNITED STATES PATENTS

| | | |
|---|---|---|
| 1,425,482 | James | Aug. 8, 1922 |
| 1,903,457 | Holstein | Apr. 11, 1933 |
| 2,238,706 | Ohls | Apr. 15, 1942 |

FOREIGN PATENTS

| | | |
|---|---|---|
| 51,961 | France | Feb. 22, 1943 |
| 735,482 | Germany | May 15, 1943 |
| 724,008 | Great Britain | Feb. 16, 1955 |